A. McCURLEY.
Combined Harrow and Cultivator.
No. 209,823. Patented Nov. 12, 1878.
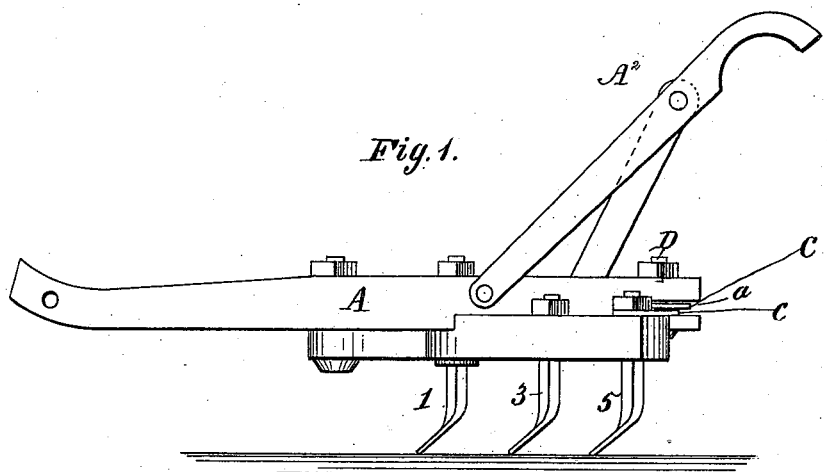
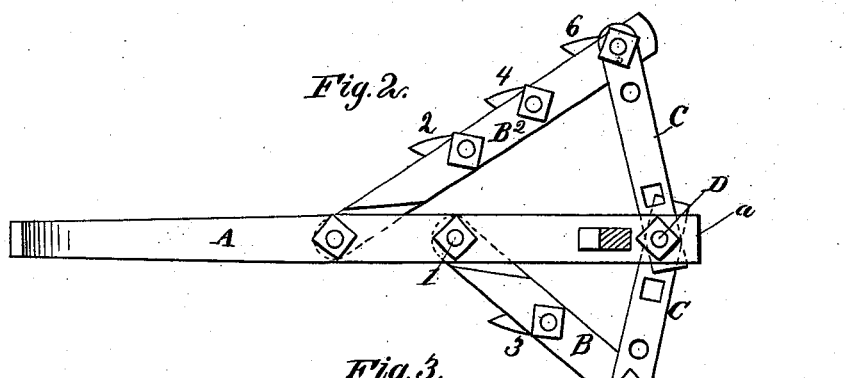
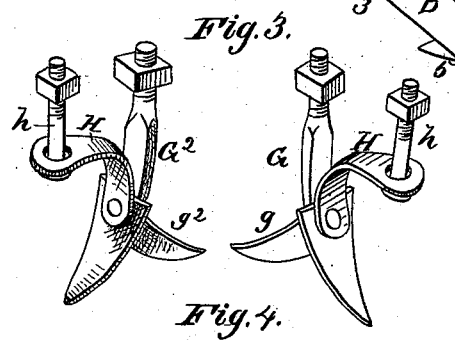
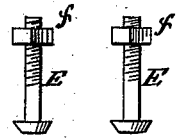
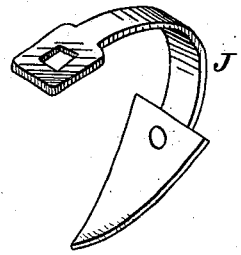
WITNESSES:
Henry N. Miller
C. Sedgwick
INVENTOR:
A. McCurley
BY Munn & Co
ATTORNEYS.

UNITED STATES PATENT OFFICE.

ALFRED McCURLEY, OF MADISON, ALABAMA.

IMPROVEMENT IN COMBINED HARROW AND CULTIVATOR.

Specification forming part of Letters Patent No. 209,823, dated November 12, 1878; application filed August 15, 1878.

*To all whom it may concern:*

Be it known that I, ALFRED McCURLEY, of Madison, in the county of Madison and State of Alabama, have invented a new and useful Improvement in Combined Harrow and Cultivator, of which the following is a specification:

The invention will first be described in connection with the drawings, and then pointed out in the claim.

The accompanying drawings represent an implement constructed according to my invention.

Figure 1 is a side view, showing the implement arranged as a harrow. Fig. 2 is a top view of the same. Figs. 3, 4, and 5 are detail views, hereinafter referred to.

Similar letters of reference indicate corresponding parts.

The main draw-beam A is of the usual or any suitable construction, and is provided with plow-handles $A^2$, attached in the usual manner.

The adjustable beams B $B^2$ have their front ends attached to the beam A at two different points. The beam B is attached at a point about under the point of attachment of the lower ends of the handles, and the beam $B^2$ at a point farther forward. The attachment is made by means of a screw-bolt and nut for the beam $B^2$, and by a screw-thread and nut on the shank of a harrow-tooth for the beam B. This mode of attachment of the beams B $B^2$ allows them to swing, as hereinafter described.

To the rear end of each of the adjustable beams is pivoted one end of a flat bar, C, provided with holes for the passage of a bolt, D. The other end of each bar C is passed through a notch or slot, $a$, in the rear end of the beam A, and the bolt D passes through the holes in both bars and the rear end of the beam A, and holds the beams B $B^2$ firmly and steadily in position with relation to the main draw-beam A.

By removing the bolt D and moving the bars C so as to cause said bolt to engage with another one of the holes in each bar, the beams B $B^2$ may be adjusted nearer to or farther from the main beam A, as may be desired.

The harrow-teeth carried by the beams B $B^2$ are provided with angular shanks, which pass through holes in said beams, and are secured by nuts on their screw-threaded ends.

When the parts are arranged as shown in Figs. 1 and 2 the implement is adapted to the harrowing of both sides of a cotton or corn row at the same time.

On referring to Fig. 2 it will be seen that the harrow-teeth 1 3 5 on the beam B are arranged in a diagonal line, starting from the draw-beam A, while the teeth 2 4 6 on the beam $B^2$ are arranged in a similar diagonal line, starting from a point on said beam $B^2$ corresponding with a line drawn through the tooth 1 at a right angle to the length of the draw-beam A. The horse being attached to the draw-beam A and pulling in a direct line with said beam, the teeth 1 3 5 will travel in the furrow on one side of the cotton or corn row, the horse and the plowman walking in the same furrow, and the teeth 2 4 6 will travel in the furrow which lies on the opposite side of said cotton or corn row, while the portion of the beam $B^2$ and bar C which lies between two parallel lines drawn rearward from the teeth 1 and 2 will pass over said cotton or corn row without touching the same.

When the parts are arranged as shown in the drawings, the upper ends of the shanks of the teeth 5 and 6 form the pivots for the outer ends of the bars C.

In order to adapt the implement to be used for cultivating both sides of the cotton or corn row at the same time, all the harrow-teeth are removed and the bolts E and $f$ (shown in Fig. 5) are substituted for the shanks of the teeth 5 and 6 and their nuts, in order to secure the bars C to the beams B $B^2$, and the shank of the harrow-tooth 1 is replaced by a bolt and nut, in order to secure the front end of the beam B to the beam A. Two cultivator-blades are then attached by their shanks to the beams B $B^2$.

Fig. 3 shows a novel construction of cultivator-blades which may be employed in connection with this implement.

G $G^2$ represent two cultivator-blades, the shanks of which are screw-threaded and provided with nuts. At the point of attachment of the blades to the shanks additional blades $g$ $g^2$ are attached, which additional blades have their points extending at about right angles to the direction of the points of the main blades. A brace, H, has its lower end riveted or bolted to the blade and shank at the point of attachment thereof, and its upper end curved forward and provided with a screw-threaded bolt, $h$, furnished with a nut. The cultivator-blade G is substituted for the harrow-tooth 3, and the cultivator-blade $G^2$ is substituted for the harrow-tooth 4, so that the additional blades $g$ $g^2$ point toward each other. The screw-bolts $h$ $h$ are inserted, respectively, in the holes previously occupied by the shanks of the harrow-teeth 1 and 2, and thus serve to strengthen the cultivator-blades in position. When arranged in this manner the implement is adapted for cultivating both sides of a row and for throwing soil on both sides of a row.

By reversing the positions of the cultivator-blades G and $G^2$, so that the additional blades $g$ and $g^2$ will point outward instead of toward each other, and then by attaching a cultivator-blade, J, of the form shown in Fig. 4, to the rear end of the draw-beam A by inserting the end of its shank in slot $a$ and securing it with the bolt D, a cultivator is produced which may be used for plowing between two rows.

Having thus described my invention, I claim as new and desire to secure by Letters Patent—

A harrow or cultivator frame consisting of the beam A, tooth-bars B $B^2$, and adjustable spacing-bars C C, the bars on one side being longer than on the other, as shown and described, so that in cultivating on both sides of a row the line of draft may be thrown to one side, to prevent the horse or workman from tramping on the plants in the row.

ALFRED  his × McCURLEY.
mark.

Witnesses:
THOMAS B. HOPKINS,
E. S. MARTIN.